US012729519B2

(12) United States Patent
Ruffo et al.

(10) Patent No.: US 12,729,519 B2
(45) Date of Patent: Sep. 8, 2026

(54) SYSTEM CONDITION DETECTION USING INLET PRESSURE

(71) Applicant: Fluid Handling LLC, Morton Grove, IL (US)

(72) Inventors: Matthew J. Ruffo, Geneva, NY (US); Paul Ruzicka, Auburn, NY (US)

(73) Assignee: FLUID HANDLING LLC, Morton Grove, IL (US)

( * ) Notice: Subject to any disclaimer, the term of this patent is extended or adjusted under 35 U.S.C. 154(b) by 863 days.

(21) Appl. No.: 16/598,364

(22) Filed: Oct. 10, 2019

(65) Prior Publication Data

US 2020/0116167 A1 Apr. 16, 2020

Related U.S. Application Data

(60) Provisional application No. 62/743,723, filed on Oct. 10, 2018.

(51) Int. Cl.

*E03B 7/07* (2006.01)
*C02F 1/00* (2023.01)
*F04B 49/02* (2006.01)

(52) U.S. Cl.

CPC .............. *E03B 7/075* (2013.01); *C02F 1/006* (2013.01); *F04B 49/02* (2013.01)

(58) Field of Classification Search

None

See application file for complete search history.

(56) References Cited

U.S. PATENT DOCUMENTS 2,100,365 A * 11/1937 Stratton .................... F04D 9/02 415/11
2,313,585 A * 3/1943 Rupp ...................... F04D 9/005 415/56.1

(Continued)

FOREIGN PATENT DOCUMENTS

CA 2767538 A1 6/2013
CN 1688769 A 10/2005

(Continued)

OTHER PUBLICATIONS

Machine Translation of CN-2809277 (Translation provided by USPTO Search, Clarivate Analytics, 2022) (Year: 2022).*

(Continued)

*Primary Examiner* — Dominick L Plakkoottam
*Assistant Examiner* — Geoffrey S Lee
(74) *Attorney, Agent, or Firm* — William J. Barber; MAGUIRE & BARBER LLP

(57) ABSTRACT

A controller for a municipal water system having a pump connected to a suction line, featuring a signal processor and a memory module configured to: receive suction line pressure sensor signaling sensed by a suction line pressure sensor arranged on the suction line and containing information about a suction line pressure of water flowing in the suction line; receive low suction pressure limit signaling programmed in the memory module and containing information about a low suction pressure limit of the water flowing in the suction line; and provide control signaling containing information to control the operation of the pump depending on a relationship between the suction line pressure and the low suction pressure limit, based upon the suction line pressure sensor signaling and the low suction pressure limit signaling received. The control signaling may contain information to reduce or stop the water flowing in (Continued)

suction line if the suction line pressure falls below the low suction pressure limit.

4 Claims, 6 Drawing Sheets

(56) References Cited

U.S. PATENT DOCUMENTS 2,386,275 A * 10/1945 Sigmund ................ F04D 9/047 192/84.1
2,420,420 A * 5/1947 Durdin .................... F04D 9/005 415/206
2,461,925 A * 2/1949 Rupp ........................ F04D 9/02 96/217
2,486,288 A * 10/1949 Jacuzzi .................... F04D 9/06 417/80
2,510,190 A * 6/1950 Nicolette ................. F04D 9/02 415/24
2,572,263 A * 10/1951 Hofer ...................... E02F 3/907 417/279
2,627,812 A * 2/1953 Mann ........................ F04D 9/02 415/56.6
2,627,817 A * 2/1953 Mann ........................ F04D 9/02 415/56.6
2,734,460 A * 2/1956 Deters ..................... F04D 9/005 415/11
2,767,277 A * 10/1956 Wirth ..................... H01H 35/34 200/83 Z
2,883,936 A * 4/1959 Daddario ................ F04D 9/006 417/89
3,556,406 A * 1/1971 King .................... A01G 25/097 239/731
3,591,316 A * 7/1971 Piccirilli ................. F04D 9/065 415/24
4,124,332 A * 11/1978 Nishijyo ................. F04D 13/16 417/26
5,141,535 A * 8/1992 Elonen ............... B01D 19/0052 96/217
5,154,821 A * 10/1992 Reid ......................... E04H 4/12 4/496
5,213,477 A * 5/1993 Watanabe ............. F04B 49/065 417/20
5,324,166 A * 6/1994 Elonen .................... F04D 13/16 96/214
5,417,145 A 5/1995 Joseph, Jr. et al.
5,772,403 A 6/1998 Allison et al.
5,947,700 A * 9/1999 McKain ................ F04B 49/022 417/63
6,055,851 A 5/2000 Tanaka et al.
6,099,264 A * 8/2000 Du .......................... F04B 49/03 417/43
6,171,073 B1 * 1/2001 McKain ................. A61H 33/60 417/306
6,220,747 B1 4/2001 Gosselin
6,468,052 B2 * 10/2002 McKain ............... A61H 33/005 417/18
6,471,476 B1 * 10/2002 Diels ..................... F04D 29/628 416/1
6,575,706 B2 * 6/2003 Carnes .................... F04D 9/043 137/202
6,655,922 B1 12/2003 Flek
6,663,349 B1 * 12/2003 Discenzo ............ F04D 15/0245 417/44.1
6,709,241 B2 3/2004 Sabini et al.
6,954,713 B2 10/2005 Eryurek
7,066,197 B1 6/2006 Gray et al.
7,353,875 B2 * 4/2008 Stephenson ............. B01F 23/59 166/305.1
7,635,253 B2 12/2009 Garcia-Ortiz
7,901,190 B2 3/2011 Gray
7,931,447 B2 * 4/2011 Levin .................... F04B 49/002 700/282
8,757,986 B2 6/2014 Villareal et al.
8,760,302 B1 6/2014 Macdonald
9,115,567 B2 8/2015 Hsu et al.
9,127,678 B2 9/2015 Gomez et al.
9,546,652 B2 1/2017 Yin
9,605,680 B2 * 3/2017 Stiles, Jr. ............ F04D 15/0088
9,822,776 B2 11/2017 Pop
10,047,741 B2 8/2018 Zhang et al.
10,947,981 B2 * 3/2021 Stiles .................. F04D 15/0066
11,111,923 B2 * 9/2021 Dorsey ..................... E04H 4/12
2001/0002238 A1 * 5/2001 McKain ................. A61H 33/60 417/280
2001/0041139 A1 * 11/2001 Sabini ................. F04D 15/0066 417/18
2003/0091443 A1 5/2003 Sabrini et al.
2003/0106147 A1 * 6/2003 Cohen ....................... E04H 4/12 4/504
2004/0000525 A1 * 1/2004 Hornsby ............... E04H 4/1245 210/776
2004/0219025 A1 * 11/2004 Garcia-Ortiz ......... F04B 49/065 417/44.2
2005/0178792 A1 8/2005 Knepler
2006/0292012 A1 12/2006 Brudevold et al.
2007/0137862 A1 * 6/2007 Stephenson ........... E21B 43/267 166/305.1
2007/0177985 A1 * 8/2007 Walls .................... F04B 49/022 417/44.2
2008/0003114 A1 * 1/2008 Levin .................... F04B 49/065 417/306
2011/0265562 A1 11/2011 Li
2014/0044560 A1 * 2/2014 Komatsu ............. F04D 15/0066 417/19
2014/0379300 A1 12/2014 Devine et al.
2015/0192115 A1 * 7/2015 Seith ..................... F04B 43/073 417/46
2016/0195092 A1 7/2016 Springer et al.
2017/0119256 A1 5/2017 Demou et al.
2018/0087499 A1 3/2018 Zhang et al.
2018/0209430 A1 7/2018 Nofal et al.
2019/0024655 A1 1/2019 Donaldson
2019/0353156 A1 * 11/2019 Ward .................... F04B 49/065
2020/0158115 A1 * 5/2020 Mei ..................... F04D 15/0005

FOREIGN PATENT DOCUMENTS

CN 2809277 Y * 8/2006
CN 2835363 Y 11/2006
CN 202157370 U 3/2012
CN 203035522 U * 7/2013
CN 104214078 A * 12/2014
CN 108138981 A 6/2018
JP H06 25580 U 4/1994
JP 2000-337264 A 12/2000
JP 2002 310070 A 10/2002
JP 2017218977 A 12/2017
KR 20180026054 A 3/2018
WO 2018206843 A1 11/2018

OTHER PUBLICATIONS

Machine Translation of CN-203035522 (Translation provided by USPTO Search, Clarivate Analytics, 2023) (Year: 2023).*
Machine Translation of CN-104214078 (Translation provided by USPTO Search, Clarivate Analytics, 2023) (Year: 2023).*
Muller-Girard (Marks' Standard Handbook for Mechanical Engineers, Section 16.1) (Year: 1996).*
Subbaraj, P., and B. Kannapiran, "Artificial neural network approach for fault detection in pneumatic valve in cooler water spray system," International Journal of Computer Applications, vol. 9.7, pp. 43-52, 2010.
Parrondo, Jorge L., Sandra Velarde, and Carlos Santolaria, "Development of a predictive maintenance system for a centrifugal pump," Journal of Quality in Maintenance Engineering, vol. 4.3, pp. 198-211, 1998.
Chi, L., R. L. Kushwaha, and F. W. Bigsby, "Chemical flow rate control in injection-type sprayers," Canadian Agricultural Engineering, vol. 30.1, pp. 19-26, 1988.

(56) References Cited

OTHER PUBLICATIONS

Thin, Khin Cho, Mya Mya Khaing, and Khin Maung Aye, "Design and performance analysis of centrifugal pump," World Academy of Science, Engineering and Technology, vol. 46, pp. 422-429, 2008.
Amin, Sanket, Carl Byington, and Matthew Watson, "Fuzzy inference and fusion for health state diagnosis of hydraulic pumps and motors," NAFIPS 2005—2005 Annual Meeting of the North American Fuzzy Information Processing Society, IEEE, 6 pages, 2005.
Kaya, Durmus, et al., "Energy efficiency in pumps," Energy Conversion and Management, vol. 49.6, pp. 1662-1673, 2008. http:/akademikpersonel.kocaeli.edu.tr/kyigit/sci/kyigit14.05.2013_23.29.09sci.pdf.
English language Abstract and translation of KR20180026054.
English language Abstract of CN108138981A.
English language Abstract of CN202157370U.
English language Abstract of JP2017218977A.
English language Abstract of JP2000-337264.
English language Abstract of CN2835363.
English language translation of JPH0625580U.
English language translation of JP2002310070A.

* cited by examiner

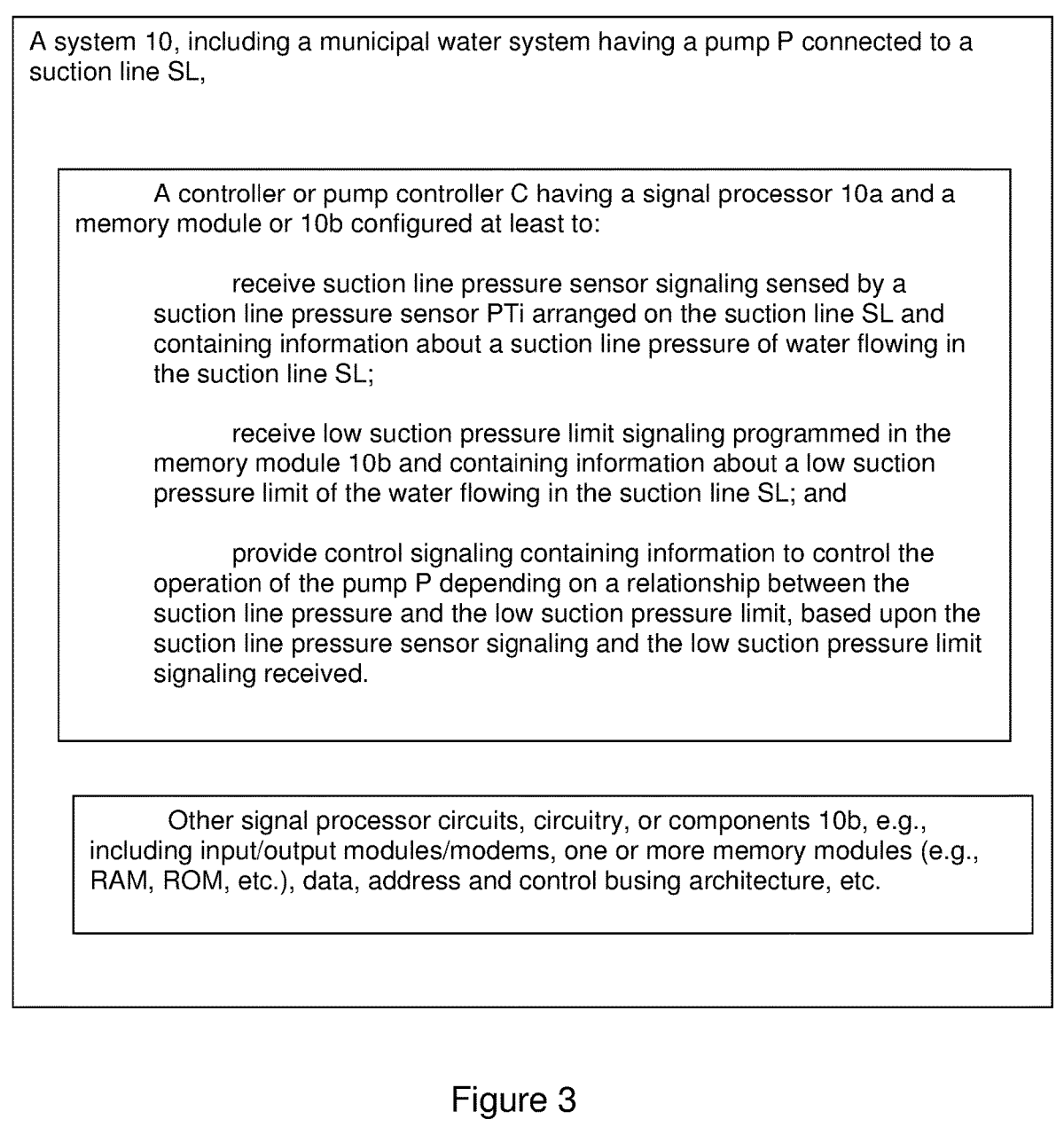

A system 10, including a municipal water system having a pump P connected to a suction line SL, A controller or pump controller C having a signal processor 10a and a memory module or 10b configured at least to:

receive suction line pressure sensor signaling sensed by a suction line pressure sensor PTi arranged on the suction line SL and containing information about a suction line pressure of water flowing in the suction line SL;

receive low suction pressure limit signaling programmed in the memory module 10b and containing information about a low suction pressure limit of the water flowing in the suction line SL; and provide control signaling containing information to control the operation of the pump P depending on a relationship between the suction line pressure and the low suction pressure limit, based upon the suction line pressure sensor signaling and the low suction pressure limit signaling received.

Other signal processor circuits, circuitry, or components 10b, e.g., including input/output modules/modems, one or more memory modules (e.g., RAM, ROM, etc.), data, address and control busing architecture, etc.

Figure 3

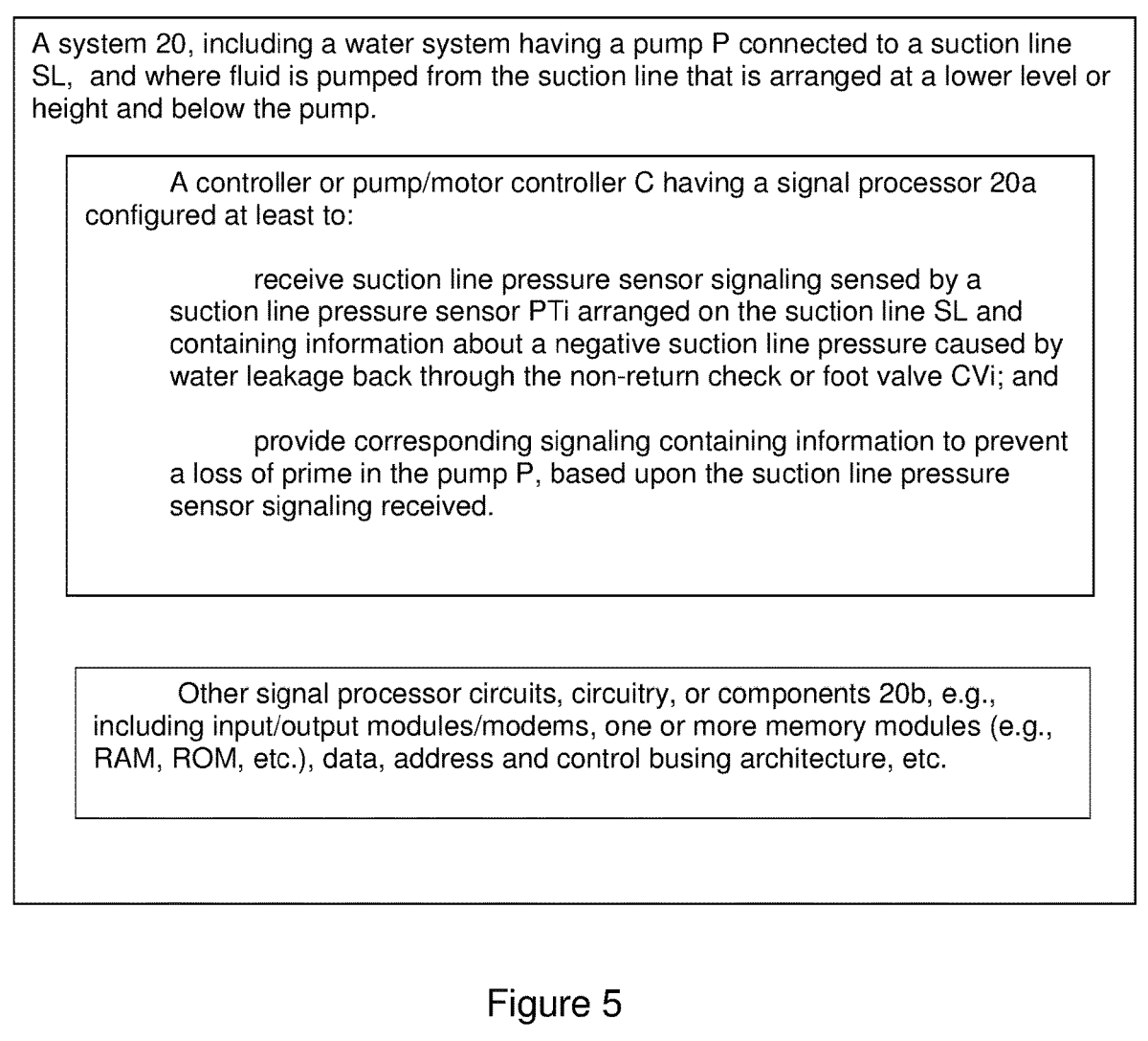

A system 20, including a water system having a pump P connected to a suction line SL, and where fluid is pumped from the suction line that is arranged at a lower level or height and below the pump.

A controller or pump/motor controller C having a signal processor 20a configured at least to:

receive suction line pressure sensor signaling sensed by a suction line pressure sensor PTi arranged on the suction line SL and containing information about a negative suction line pressure caused by water leakage back through the non-return check or foot valve CVi; and provide corresponding signaling containing information to prevent a loss of prime in the pump P, based upon the suction line pressure sensor signaling received.

Other signal processor circuits, circuitry, or components 20b, e.g., including input/output modules/modems, one or more memory modules (e.g., RAM, ROM, etc.), data, address and control busing architecture, etc.

Figure 5

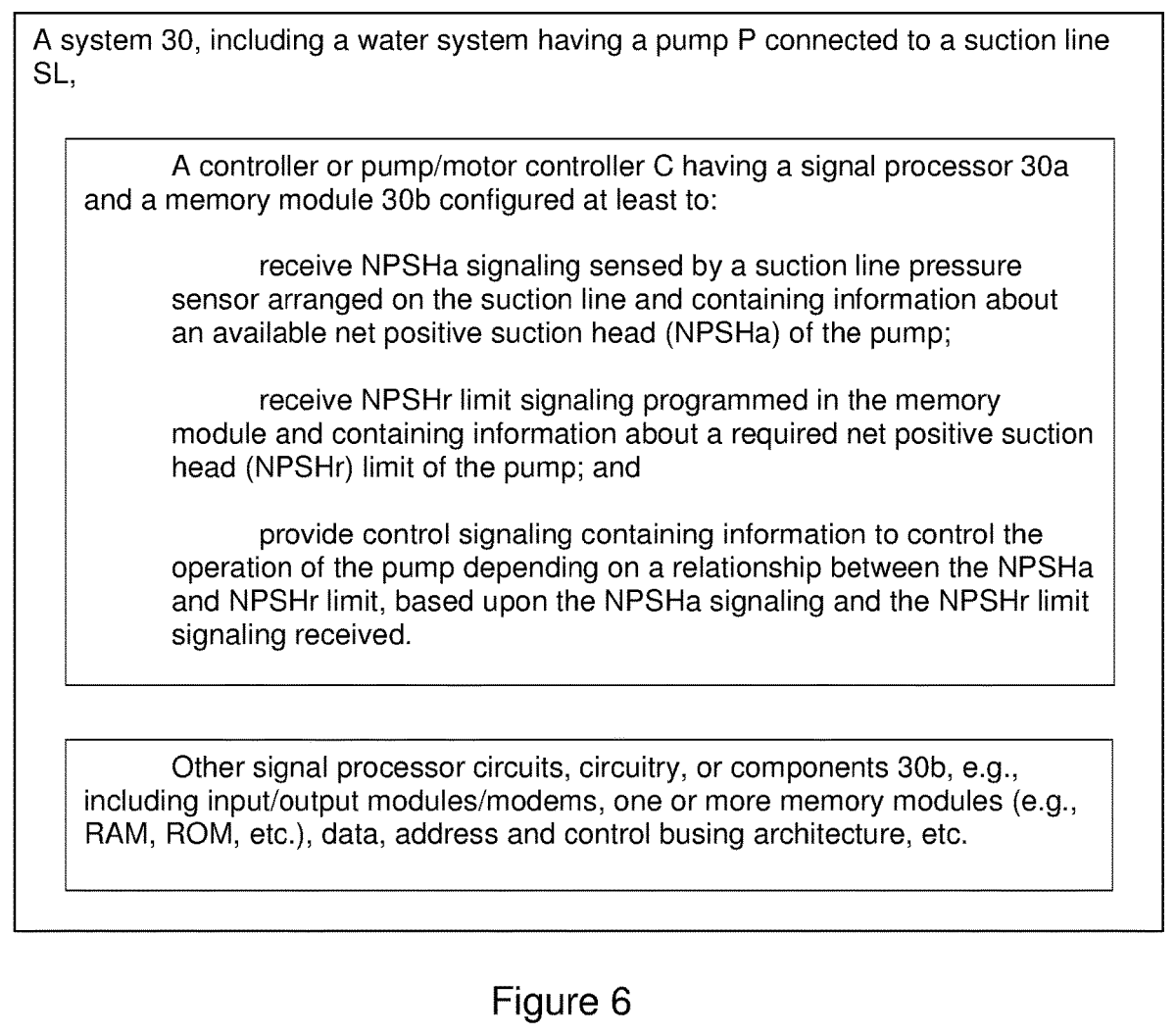

A system 30, including a water system having a pump P connected to a suction line SL, A controller or pump/motor controller C having a signal processor 30a and a memory module 30b configured at least to:

receive NPSHa signaling sensed by a suction line pressure sensor arranged on the suction line and containing information about an available net positive suction head (NPSHa) of the pump;

receive NPSHr limit signaling programmed in the memory module and containing information about a required net positive suction head (NPSHr) limit of the pump; and provide control signaling containing information to control the operation of the pump depending on a relationship between the NPSHa and NPSHr limit, based upon the NPSHa signaling and the NPSHr limit signaling received.

Other signal processor circuits, circuitry, or components 30b, e.g., including input/output modules/modems, one or more memory modules (e.g., RAM, ROM, etc.), data, address and control busing architecture, etc.

Figure 6

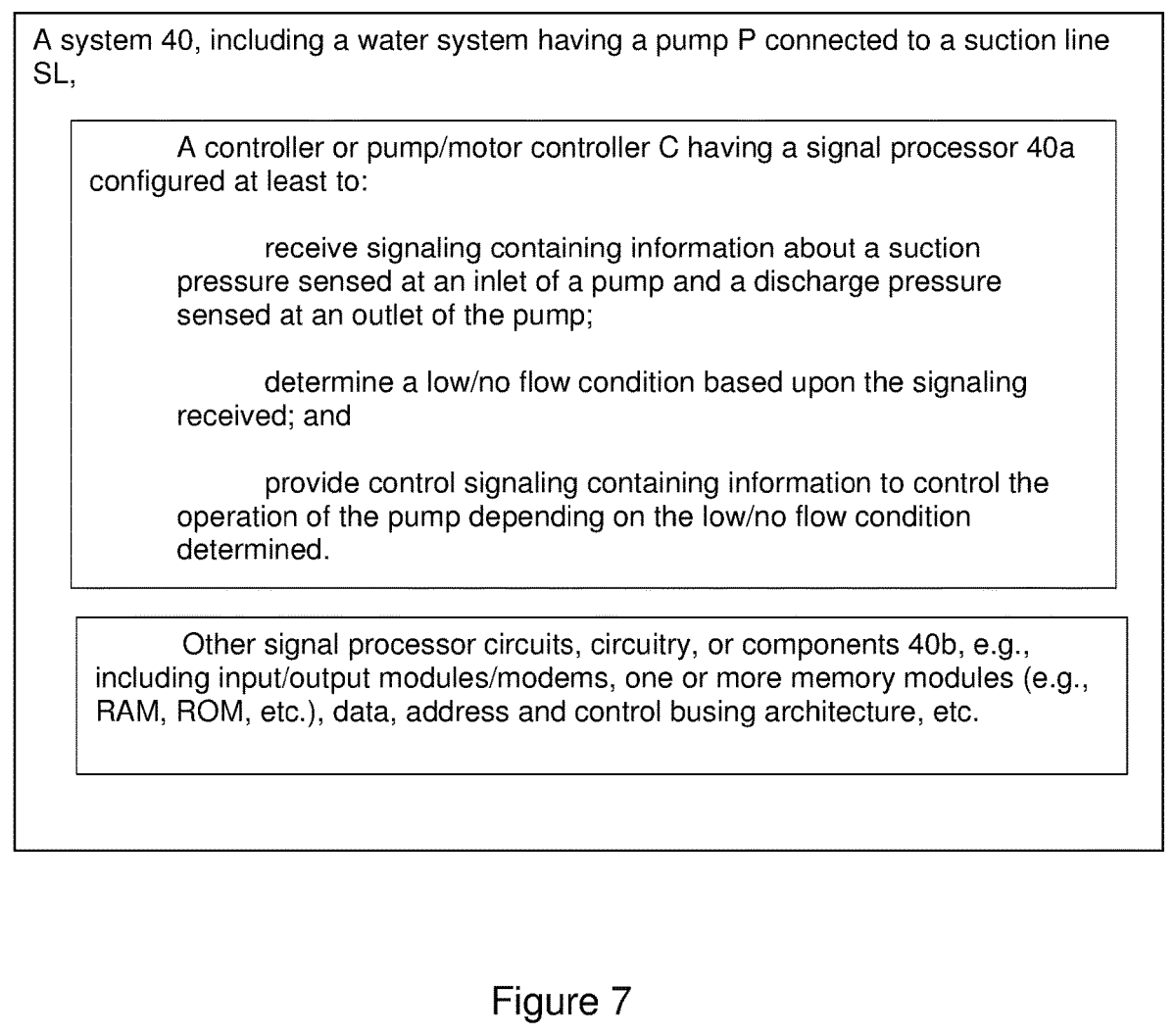

A system 40, including a water system having a pump P connected to a suction line SL, A controller or pump/motor controller C having a signal processor 40a configured at least to:

receive signaling containing information about a suction pressure sensed at an inlet of a pump and a discharge pressure sensed at an outlet of the pump;

determine a low/no flow condition based upon the signaling received; and provide control signaling containing information to control the operation of the pump depending on the low/no flow condition determined.

Other signal processor circuits, circuitry, or components 40b, e.g., including input/output modules/modems, one or more memory modules (e.g., RAM, ROM, etc.), data, address and control busing architecture, etc.

Figure 7

SYSTEM CONDITION DETECTION USING INLET PRESSURE

CROSS-REFERENCE TO RELATED APPLICATION

This application claims benefit to provisional patent application Ser. No. 62/743,723, filed 10 Oct. 2018, which is hereby incorporated by reference in its entirety.

BACKGROUND OF THE INVENTION

1. Field of the Invention

The present invention relates to a pumping system; and more particularly relates to detecting conditions in the pumping system.

2. Brief Description of Related Art

Most water pressure control systems include a pump/motor, motor controller, non-return (check) valve, accumulator tank (expansion tank) and pressure transducer/switch, e.g., as shown in FIG. 1. The signal from the pressure transducer/switch is transmitted to the motor controller to control the process variable, pressure. In these water pressure control systems, the pressure transducer is mounted on the discharge pipe in order to control the system pressure.

A design aspect of a typical system is to turn off the pump/motor when system flow reaches 0 or reaches a low flow value. This can be accomplished a number of ways including, but not limited to, measuring motor power consumption or perturbation of the pressure in the system. In the former approach, the motor power consumption will drop when the flow in the system reaches 0 or a low flow value. This power limit can be set or preset in the controller to allow turn off at low/zero flow. In the later approach, the controller is modulated to adjust the motor speed which causes a change in pressure. The resulting pressure change is monitored in order to determine the system flow condition.

Some drawbacks of the typical system configuration are set forth below.

1) When the typical system reaches a low/no flow condition and the pump/motor is turned off, there is no knowledge of the inlet/suction pressure due to the placement of the check valve.

2) Using motor power consumption alone to determine system flow condition can result in nuisance tripping or not turning off at low/0 flow. Proper use of the function requires the user to adjust or tune the setting for each pump/motor and system. This increases installation time and complexity in commissioning.

3) Using system pressure perturbation alone to determine system flow can also result in nuisance tripping or not turning off at low/0 flow. This is especially true in cases where the expansion tank is large. In these cases, the system pressure changes slowly so nuisance no flow conditions can be detected.

4) In either case, there is no way to directly measure the flow rate in the system. An attempt can be made to characterize the system to determine flow rate using speed, power and pressure, but this method is accurate only if there is a single pump or source of flow in the system.

In view of the aforementioned, there is a need in the industry for a better pump control system.

SUMMARY OF THE INVENTION

The pump control system according to the present invention can overcome the issues associated with the traditional system known in the art. For example, system flow can be directly measured by measuring the pressure difference between the suction and discharge pressure across the pump housing and piping. This gives many advantages over the existing solution. The low/0 flow condition can be directly measured. No power measurement, tuning or pressure perturbation methods are required to detect low/0 flow. This method will not require adjustment as in the above mentioned methods because flow is derived directly.

In the pump control system according to the present invention, the controller always has a direct measure of the system suction/inlet pressure conditions, even when the check valve is closed. This allows many opportunities for additional diagnostics and system condition information.

This configuration can also be used to adjust the pump output to avoid pumping beyond the available net positive suction head (NPSHa). A centrifugal pump has a required net positive suction head (NPSHr) in order to meet a given flow and pressure design point. If the NPSHa is below the NPSHr then the pump will not meet the design point. If the NPSHa falls too far below the NPSHr, damage can result due to cavitation. Using this configuration pump damage can be avoided by reducing the output of the pump based on NPSHa. For example, the controller may be programmed with NPSHr limits for a given pump. If the NPSHa falls below these limits, the pump speed can be adjusted to avoid cavitation.

In a municipal pressure boosting and other potable water applications with buried piping, the suction line to the pump must always maintain a positive pressure to avoid health issues due to ingress of contaminants. This configuration according to the present invention can be used to prevent the pump from drawing the suction line pressure below the low pressure limit. For example, the controller may be programmed with a low suction pressure limit. If the suction pressure falls below this limit, the pump output can be reduced or stopped to avoid drawing the suction line pressure below a safe limit.

Also in municipal applications, the data from the suction line sensor can be used by the utility to monitor the status of their infrastructure. Doing so allows the utility to address line leaks, breakages, low pressure areas and maintenance in a more efficient manner.

In systems where fluid is being pumped from a level lower than the pump, this configuration according to the present invention can be used to detect loss of prime. Such systems have a non-return (check or foot) valve on the suction line to prevent loss of prime. This foot valve can leak and the pump can then lose prime. The suction side sensor can be used to detect this condition. When the fluid leaks back through the foot valve, the result will be a negative pressure on the suction line (given that the foot valve is beneath the fluid level). This condition can be detected and provide a notification to aid troubleshooting.

Also in systems where fluid is being pumped from a level lower than the pump, the suction line sensor can also indicate the depth to the fluid and/or the depth to the water in the suction pipe. When the suction pipe is emptied of water and the pump starts, it begins to evacuate the air from the suction line and pull fluid into the suction line. As the pump continues to run, suction pressure drop as more fluid is pulled in to the suction line. The suction line pressure will be proportional to the depth of water. For example, if the suction line pressure corresponds to −20 ft of water, then the depth to water is 20 ft., or 20 ft. of suction line is filled with water. The suction line sensor can transmit this information to the controller for additional processing and diagnostics. In implementations for level sensing, the non-return (check or foot) valve on the suction line is not needed per se to detect the level. It's purpose is to keep the pump primed.

SPECIFIC EMBODIMENTS

Controller for Municipal Water System

According to some embodiments, and by way of example, the present invention may include, or take the form of, a controller for a municipal water system having a pump connected to a suction line, featuring:

- a signal processor and a memory module configured to:
  - receive suction line pressure sensor signaling sensed by a suction line pressure sensor arranged on the suction line and containing information about a suction line pressure of water flowing in the suction line;
  - receive low suction pressure limit signaling programmed in the memory module and containing information about a low suction pressure limit of the water flowing in the suction line; and
  - provide control signaling containing information to control the operation of the pump depending on a relationship between the suction line pressure and the low suction pressure limit, based upon the suction line pressure sensor signaling and the low suction pressure limit signaling received.

According to some embodiments, and by way of example, the present invention may include, or take the form of, a municipal water system having a pump connected to a suction line, featuring: a suction line pressure sensor arranged on the suction line, and configured to sense a suction line pressure of water flowing in the suction line, and provide suction line pressure sensor signaling containing information about the suction line pressure sensed; and a controller having a signal processor and a memory module configured to: receive the suction line pressure sensor signaling; receive low suction pressure limit signaling programmed in the memory module and containing information about a low suction pressure limit of the water flowing in the suction line; and provide control signaling containing information to control the operation of the pump depending on a relationship between the suction line pressure and the low suction pressure limit, based upon the suction line pressure sensor signaling and the low suction pressure limit signaling received.

The control signaling may contain information to reduce or stop the pump from pumping the water flowing in suction line if the suction line pressure falls below the low suction pressure limit.

Loss of Prime and/or Level Sensing

According to some embodiments, and by way of example, the present invention may include, or take the form of, a water system where fluid is pumped from a suction line having a non-return check or foot valve and being arranged at a lower level or height and below a pump, featuring a controller having a signal processor configured to: receive suction line pressure sensor signaling sensed by a suction line pressure sensor arranged on the suction line and containing information about a negative suction line pressure caused, e.g., either by water leakage back through the non-return check or foot valve CVi in the case of sensing loss of prime, or due to the depth of water in the case of level sensing; and provide corresponding signaling containing information to prevent a loss of prime in the pump or about the depth to water, based upon the suction line pressure sensor signaling received.

The corresponding signaling may contain information to provide a notification to aid in troubleshooting the water leakage.

The corresponding signaling may include control signaling containing information to control the operation of the pump, including periodically turning the pump ON to prevent the loss of prime.

The water system may include the suction line pressure sensor.

The suction line pressure sensor may be configured on the suction line between the non-return check or foot valve and the pump.

NPSHa/NPSHr

According to some embodiments, and by way of example, the present invention may include, or take the form of, a controller for a water system having a pump connected to a suction line featuring a signal processor and a memory module configured to: receive NPSHa signaling sensed by a suction line pressure sensor arranged on the suction line and containing information about an available net positive suction head (NPSHa) of the pump; receive NPSHr limit signaling programmed in the memory module and containing information about a required net positive suction head (NPSHr) limit of the pump; and provide control signaling containing information to control the operation of the pump depending on a relationship between the NPSHa and NPSHr limit, based upon the NPSHa signaling and the NPSHr limit signaling received.

The control signaling may contain information to reduce the speed and output of the pump if the the NPSHa falls below the NPSHr limit to avoid damage to the pump.

Low/No Flow Detection

According to some embodiments, and by way of example, the present invention may include, or take the form of, a controller for a pump system, featuring a signal processor configured to: receive signaling containing information about a suction pressure sensed at an inlet of a pump and a discharge pressure sensed at an outlet of the pump; determine a low/no flow condition based upon the signaling received; and provide control signaling containing information to control the operation of the pump depending on the low/no flow condition determined.

The control signaling may contain information to turn off the pump if the low/no flow condition is determined.

BRIEF DESCRIPTION OF THE DRAWING

The drawing, which is not necessarily drawn to scale, includes the following Figures:

FIG. 3 is a block diagram of the system shown in FIG. 2, e.g., having a controller with a signal processor and a memory module for implementing controller functionality, according to some embodiments of the present invention.

FIG. 5 is a block diagram of the system shown in FIG. 4, e.g., having a controller with a signal processor for implementing controller functionality, according to some embodiments of the present invention.

FIG. 6 is a block diagram of the system like that shown in FIG. 2, e.g., having a controller with a signal processor for implementing controller functionality, according to some embodiments of the present invention.

FIG. 7 is a block diagram of the system like that shown in FIG. 2, e.g., having a controller with a signal processor for implementing controller functionality, according to some embodiments of the present invention.

Similar parts in Figures are labeled with similar reference numerals and labels for consistency. Every lead line and associated reference label for every element is not included in every Figure of the drawing to reduce clutter in the drawing as a whole.

DETAILED DESCRIPTION OF THE INVENTION

In summary, the present invention provides a method for detecting various system conditions using inlet pressure as an input variable. A system is configured with a pressure transducer installed on the system inlet/suction. This signal sensed by the inlet/suction pressure transducer alone or in combination with an outlet/discharge pressure transducer signal sensed on the system outlet/discharge can be used to derive various system conditions. These conditions can be used to properly control the system and/or to protect the pump.

Figure 1:
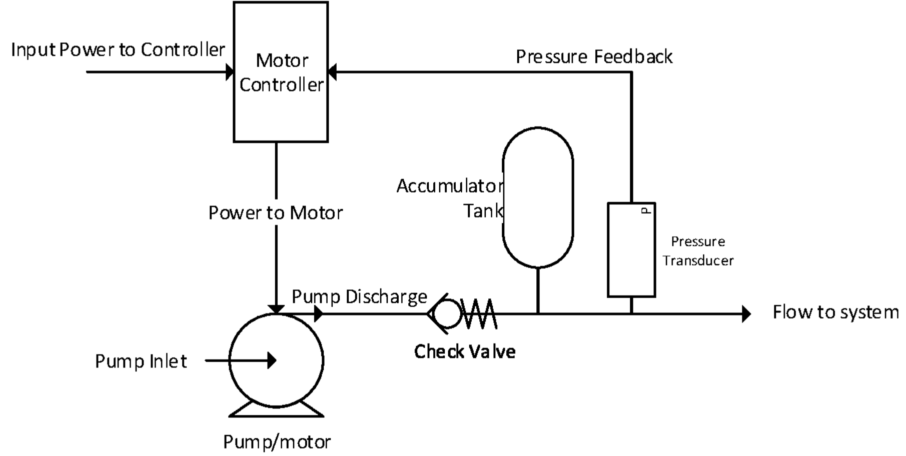
FIG. 1 shows a water pressure control system that is known in the art.
Figure 2:
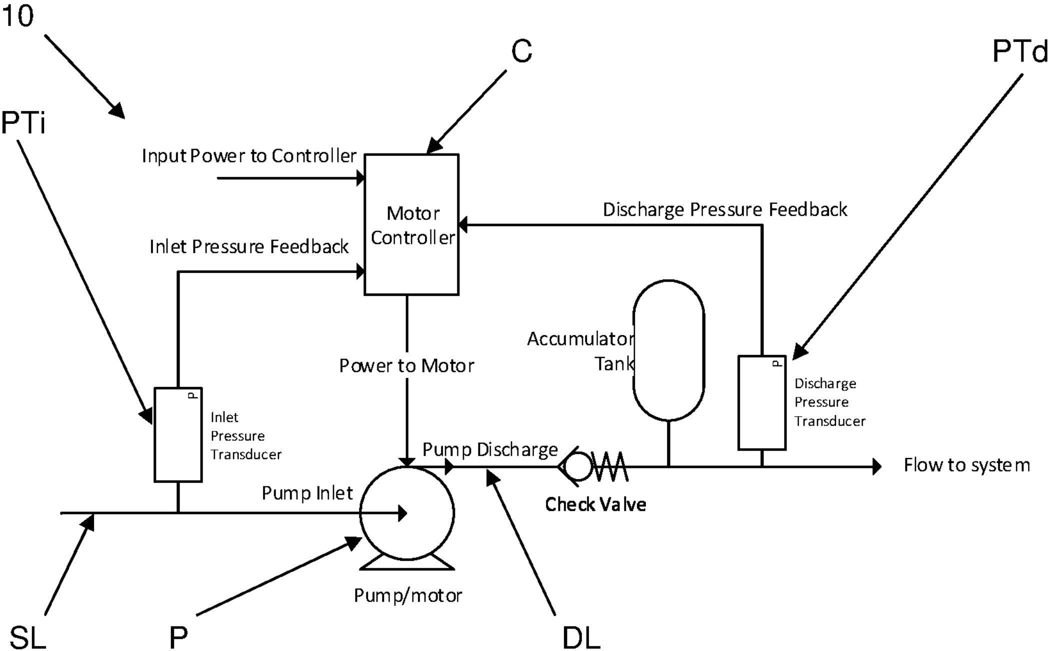
FIG. 2 shows a water pressure control system, according to some embodiments of the present invention.

FIG. 2: The System 10

By way of example, FIG. 2 shows a system generally indicated as 10, which may take the form of a municipal water system having a pump P connected to a suction line SL. The system 10 includes a controller or pump/motor controller C, an inlet pressure transducer/sensor PTi, a discharge line DL, a discharge pressure transducer/sensor PTd, a check valve and an accumulator tank. The motor controller C receives input power, inlet pressure feedback (e.g. in the form of suction line pressure sensor signaling) from the inlet pressure transducer sensor PTi, and discharge pressure feedback (e.g., in the form of discharge line pressure sensor signaling) from the discharge pressure transducer sensor PTd, and provides control signaling to control the operation of the pump P, e.g., in the form of providing power to the motor of the pump P. The pump P includes a pump inlet coupled to the suction line SL to receive an inlet flow, and also includes a pump discharge coupled to the discharge line DL to provide an outlet flow to the system as shown. The check valve is arranged on the discharge line DL to allow flow in one direction from the pump P to the system and to prevent flow in the opposite direction back to the pump P.

FIG. 3: Controller for Municipal Water System

By way of example, FIG. 3 shows a block diagram of the system 10, having the controller C with a signal processor 10*a* and a memory module 10*b*. Consistent with that shown in FIGS. 2-3, and according to some embodiments, the present invention may take the form of the controller C having the signal processor 10*a* and the memory module or 10*b* configured at least to:

- receive suction line pressure sensor signaling sensed by the suction line pressure sensor PTi arranged on the suction line SL and containing information about a suction line pressure of water flowing in the suction line SL;
- receive low suction pressure limit signaling programmed in the memory module 10*b* and containing information about a low suction pressure limit of the water flowing in the suction line SL; and
- provide control signaling containing information to control the operation of the pump P depending on a relationship between the suction line pressure and the low suction pressure limit, based upon the suction line pressure sensor signaling and the low suction pressure limit signaling received.

By way of example, the control signaling may contain information to reduce or stop the motor and pump P from pumping the water flowing in suction line SL if the suction line pressure falls below the low suction pressure limit, consistent with that shown and described herein.

In FIG. 3, the memory module 10*b* may form part of the other signal processor circuits, circuitry, or components 10*b*. The low suction pressure limit signaling may be programmed or stored in the memory module 10*b*, e.g., by the manufacturer or the user of the system 10, e.g., depending on the particular application, etc. The scope of the invention is not intended to be limited to how the low suction pressure limit signaling is stored and/or programmed into the memory module 10*b*.

Implementation of Signal Processing Functionality

By way of example, the functionality of the signal processor or processing module 10*a* may be implemented using hardware, software, firmware, or a combination thereof. In a typical software implementation, the signal processor 10*a* would include one or more microprocessor-based architectures, e.g., having at least one signal processor or microprocessor. One skilled in the art would be able to program with suitable program code such a microcontroller-based, or microprocessor-based, implementation to perform the signal processing functionality disclosed herein without undue experimentation. For example, the signal processor 10*a* may be configured, e.g., by one skilled in the art without undue experimentation, to receive the suction line pressure sensor signaling, e.g. from the suction line pressure sensor PTi arranged on the suction line SL, and also receive the low suction pressure limit signaling, e.g. from the memory module 10*b*, consistent with that disclosed herein.

Moreover, the signal processor 10*a* may also be configured, e.g., by one skilled in the art without undue experimentation, to determine and provide the control signaling containing information to control the operation of the pump P depending on the relationship between the suction line pressure and the low suction pressure limit, based upon the suction line pressure sensor signaling and the low suction pressure limit signaling received, consistent with that disclosed herein.

The scope of the invention is not intended to be limited to any particular implementation using technology either now known or later developed in the future. The scope of the invention is intended to include implementing the functionality of the signal processor(s) 10*a* as a stand-alone processor, signal processor, or signal processor module, as well as separate processor or processor modules, as well as some combination thereof.

By way of example, the system 10 may also include, e.g., other signal processor circuits or components generally indicated 10*b*, including random access memory or memory module (RAM) and/or read only memory (ROM), input/output devices and control, and data and address buses connecting the same, and/or at least one input processor and at least one output processor, e.g., which would be appreciate by one skilled in the art.

Figure 4:
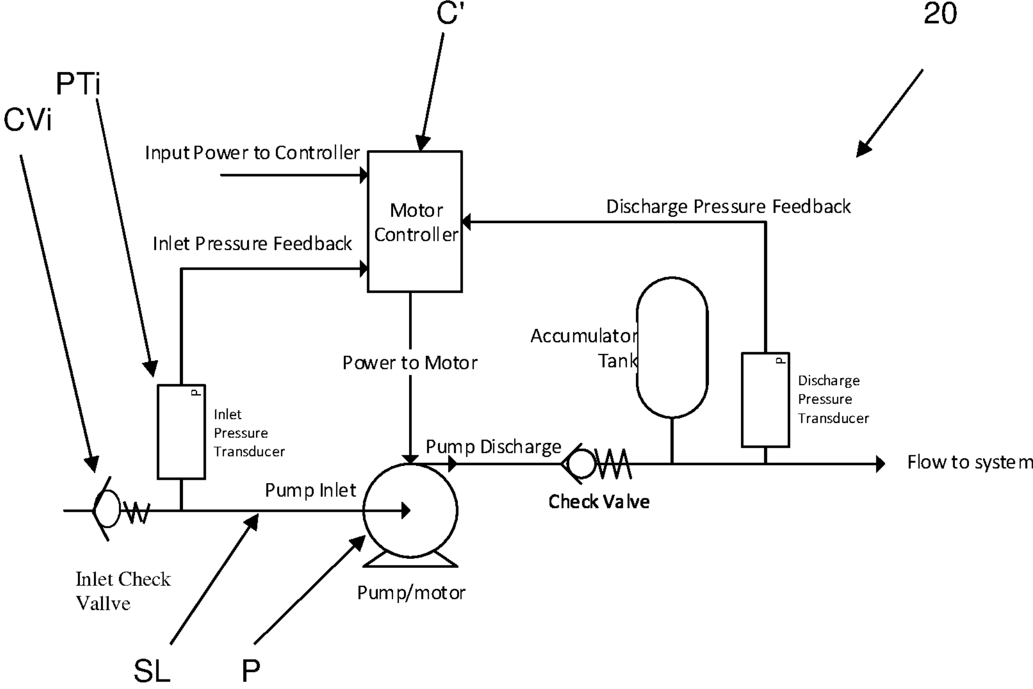
FIG. 4 shows a system like that shown in FIG. 2, but where fluid is pumped from a suction line having a non-return check or foot valve and being arranged at a lower level or height and below a pump, according to some embodiments of the present invention.

FIGS. 4-5: Loss of Prime and/or Level Sensing

By way of example, FIG. 4 shows a system generally indicated as 20, e.g., that may take the form of a water system having the pump P connected to the suction line SL, like that shown in FIG. 2. The system 20 includes the components of the system 10 shown in FIG. 2. In addition, the system 20 also includes a non-return check or foot valve labelled CVi arranged on the suction line SL, as shown. Moreover, in contrast to that shown in FIG. 2, in the system 20 in FIG. 4 fluid is being pumped from a suction line that is arranged at a lower level or height and below the pump P. By way of example, the pump P may be arranged on one floor or level in a building, and the suction line SL may be coming up from a lower floor or level in the building.

Consistent with that shown in FIGS. 4-5, and according to some embodiments, the present invention may take the form of a controller C' having the signal processor 20*a* configured at least to:

- receive suction line pressure sensor signaling sensed by a suction line pressure sensor PTi arranged on the suction line SL and containing information about a negative suction line pressure caused, e.g., either by water leakage back through the non-return check or foot valve CVi in the case of sensing loss of prime, or due to the depth of water in the case of level sensing; and
- provide corresponding signaling containing information to prevent a loss of prime in the pump P, based upon the suction line pressure sensor signaling received.

The corresponding signaling may contain information, e.g., to provide a notification to aid in troubleshooting the fluid leakage or provide information about depth to fluid. The information may also include an audio or visual warning. The scope of the invention is not intended to be limited to the type or kind of notification and/or information provided.

The corresponding signaling may include control signaling containing information to control the operation of the pump, including periodically turning the pump ON to prevent the loss of prime.

By way of further example, the negative suction line pressure may be caused by a breakage in the suction line SL, or a line connected to the suction line. The scope of the invention is not intended to be limited to the type or kind of event that causes the negative suction line pressure in the suction line SL.

According to some embodiments, the water system 20 may include the suction line pressure sensor. By way of example, and consistent with that shown in FIG. 4, the suction line pressure sensor PTi may be configured on the suction line SL between the non-return check or foot valve CVi and the pump P.

The functionality of the signal processor 20*a* may be implemented using hardware, software, firmware, or a combination thereof, e.g., consistent with that shown and described in relation to FIG. 3. By way of further example, the system 20 may also include, e.g., other signal processor circuits or components generally indicated 20*b*, including random access memory or memory module (RAM) and/or read only memory (ROM), input/output devices and control, and data and address buses connecting the same, and/or at least one input processor and at least one output processor, which would be appreciate by one skilled in the art.

FIG. 6: NPSHa/NPSHr

By way of example, FIG. 6 shows a block diagram of a system 30, having controller C with a signal processor 30*a* and a memory module 30*b*. Consistent with that shown in FIGS. 2 and 6, and according to some embodiments, the present invention may take the form of the controller C having the signal processor 30*a* and the memory module or 30*b* configured at least to:

- receive NPSHa signaling sensed by a suction line pressure sensor (e.g., like PTi (FIG. 2 or 3)) arranged on the suction line and containing information about an available net positive suction head (NPSHa) of the pump;
- receive NPSHr limit signaling programmed in the memory module 30*b* and containing information about a required net positive suction head (NPSHr) limit of the pump; and
- provide control signaling containing information to control the operation of the pump depending on a relationship between the NPSHa and NPSHr limit, based upon the NPSHa signaling and the NPSHr limit signaling received.

The control signaling may contain information to reduce the speed and output of the pump P (FIG. 2) if the the NPSHa falls below the NPSHr limit to avoid damage to the pump.

The functionality of the signal processor 30*a* may be implemented using hardware, software, firmware, or a combination thereof, e.g., consistent with that shown and described in relation to FIGS. 2 and 5. By way of further example, the system 30 may also include, e.g., other signal processor circuits or components generally indicated 30*b*, including random access memory or memory module (RAM) and/or read only memory (ROM), input/output devices and control, and data and address buses connecting the same, and/or at least one input processor and at least one output processor, e.g., which would be appreciate by one skilled in the art.

FIG. 7: Low/No Flow Detection

By way of example, FIG. 7 shows a block diagram of the system 40, having a controller C with a signal processor 40*a*. Consistent with that shown in FIGS. 2 and 7, and according to some embodiments, the present invention may take the form of the controller C having the signal processor 40*a* configured at least to:

- receive signaling containing information about a suction pressure sensed at an inlet of a pump and a discharge pressure sensed at an outlet of the pump;
- determine a low/no flow condition based upon the signaling received; and
- provide control signaling containing information to control the operation of the pump depending on the low/no flow condition determined.

The control signaling may contain information to turn off the pump P if the low/no flow condition is determined.

The functionality of the signal processor 40*a* may be implemented using hardware, software, firmware, or a combination thereof, e.g., consistent with that shown and described in relation to FIGS. 3, 5 and 6. By way of further example, the system 40 may also include, e.g., other signal processor circuits or components generally indicated 40*b*, including random access memory or memory module (RAM) and/or read only memory (ROM), input/output devices and control, and data and address buses connecting the same, and/or at least one input processor and at least one output processor, e.g., which would be appreciate by one skilled in the art.

Pressure Transducer/Sensor

Pressure transducer or sensor like PTi, PTd, are known in the art and the scope of the invention is not intended to be limited to any particular type or kind thereof, e.g., either now known or later developed in the future.

THE SCOPE OF THE INVENTION

Further still, the embodiments shown and described in detail herein are provided by way of example only; and the scope of the invention is not intended to be limited to the particular configurations, dimensionalities, and/or design details of these parts or elements included herein. In other words, a person skilled in the art would appreciate that design changes to these embodiments may be made and such that the resulting embodiments would be different than the embodiments disclosed herein, but would still be within the overall spirit of the present invention.

It should be understood that, unless stated otherwise herein, any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

What we claim is:

1. A water system comprising:

a suction line configured to provide fluid to be pumped;

a pump having a pump housing with a pump inlet and a pump discharge, and configured to receive controller signaling and pump the fluid through the pump housing from the pump inlet to the pump discharge;

a suction line non-return check or foot valve coupled to the pump inlet, having a suction line valve inlet and a suction line valve outlet, and configured to allow the fluid in the suction line to flow in a suction line direction from the suction line valve inlet to the suction line valve outlet and prevent the fluid from flowing in an opposite suction line direction;

an inlet pressure transducer arranged on the suction line, and configured to sense pump inlet pressure between the suction line non-return check or foot valve and the pump inlet and provide inlet pressure transducer signaling containing information about the pump inlet pressure sensed between the suction line non-return check or foot valve and the pump inlet;

a discharge line non-return check valve coupled to the pump discharge, having a discharge line valve inlet and a discharge line valve outlet, and configured to allow the fluid in the discharge line to flow in a discharge line pumping direction from the discharge line valve inlet to the discharge line valve outlet and prevent the fluid from flowing in an opposite discharge line direction;

a discharge pressure transducer arranged on the pump discharge and coupled to the valve outlet of the non-return check er fool valve, and configured to sense pump discharge pressure and provide discharge pressure transducer signaling containing information about the pump discharge pressure sensed;

a controller having a signal processor configured to:

receive the inlet pressure transducer signaling and the discharge pressure transducer signaling, and provide the controller signaling containing information to control and protect the pump based upon system flow by directly measuring a pressure difference between the inlet pressure transducer signaling and the discharge pressure transducer signaling across the pump housing in order to derive system conditions, including periodically turning the pump ON to prevent loss of prime.

2. A water system according to claim 1, wherein the system conditions include a net positive suction head (NPSH) condition; and the controller is configured to receive signaling containing information about a required net positive suction head (NPSHr) in order to meet a given flow and pressure design point and an available net positive suction head (NPSHa) and provide the controller signaling to reduce pump flow from the pump outlet when the NPSHa falls below the NPSHr to protect the pump.

3. A water system according to claim 1, wherein the system conditions include a low suction pressure limit condition; and the controller is configured to receive a low suction pressure limit and provide the controller signaling to reduce or stop pump flow from the pump outlet when the pump inlet pressure falls below the low suction pressure limit to protect the pump.

4. A water system according to claim 1, wherein the system conditions include a loss of prime condition when the non-return check or foot valve leaks; and the controller is configured to receive the inlet pressure transducer signaling that contains information about a negative inlet pressure sensed, and provide corresponding signaling containing information about the negative inlet pressure sensed.

* * * * *